April 7, 1970 — H. A. McCARTY — 3,504,391
BLENDER SCRAPER
Filed March 11, 1968

Helen A. McCarty
INVENTOR

BY  Bernard A. Reiter

ATTORNEY

United States Patent Office 3,504,391
Patented Apr. 7, 1970

3,504,391
BLENDER SCRAPER
Helen A. McCarty, Box 131,
Trinity, Tex. 75862
Filed Mar. 11, 1968, Ser. No. 712,137
Int. Cl. B08b 9/00
U.S. Cl. 15—236                       8 Claims

ABSTRACT OF THE DISCLOSURE

A scraper for removing excess food substance from the interior of a container such as a blender bowl. The scraper comprises a handle member having fork-like arms to each of which is affixed a scraper head. Each of the scraper heads are adjustably interconnected with one another so as to adapt to the circumference of the bowl as the scraping occurs.

SUMMARY OF THE INVENTION

This invention pertains to scrapers in general and more specifically to a scraping device for mixing bowls and the like for scraping foodstuffs or other material from the interior walls thereof.

A primary objective of this invention is to provide an improved scraping device for removing material from the inside of a container.

Another object of the present invention is to provide an improved scraping device for removing foodstuffs from the interior surface of a blender bowl.

Still another object and feature of the invention is to provide a scraping device which can remove foodstuffs from a blender bowl while the blender blades are rotating.

Another feature of the present invention resides in a scraping device for insertion into a container or blender bowl and which can remove foodstuffs from the interior thereof by application of a single downward stroke.

Yet still another feature and advantage of the invention resides in the provision for a scraping device which can remove foodstuffs from the entire surface of the bowl with but a single downward stroke.

Still another feature and advantage of the invention resides in a scraping device which is characterized by adjustable scraping heads which adapt themselves to the surface contour of the bowl so as to effectively remove foodstuffs from the surface thereof.

Yet another feature and advantage of the present invention resides in a blender bowl scraper which is of extremely simple construction and therefore inexpensive to manufacture and yet which is remarkably effective for its intended purposes.

These and numerous other feautres and advantages of the invention will become readily apparent upon the careful reading of the following detailed description, claims and accompanying drawings, wherein like numerals denote like parts in the two views and in which:

Figure 1:
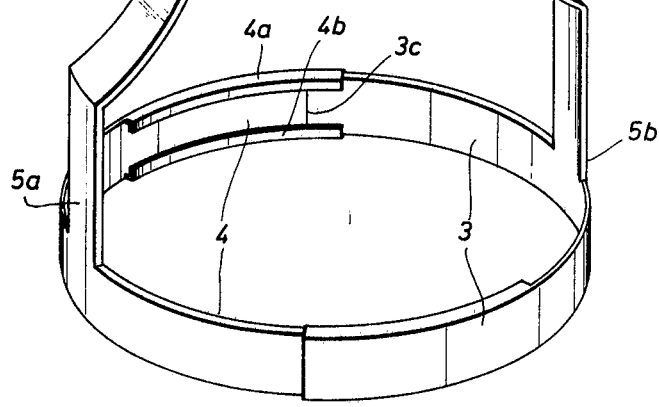
FIGURE 1 is a perspective view of a scraper device embodying the principles of the subject invention.

Referring now to FIGURE 1, there is shown a handle member 6 having at one end thereof a gripping sphere 7 and at the other end thereof a pair of cantilever mounted fork-like arms 5 disposed in opposite relationship to one another so as to equally distribute the force which will be imposed thereon when a downward thrust is applied to the handle member 6 via gripping sphere 7. Each of the foregoing arms are characterized at their remote ends 5a, 5b by semi-circular scraping heads 3, 4. The scraping heads 3, 4 are of such configuration as to readily adapt to the interior of the container or bowl in which they are to be used. In that the scraper of FIGURE 1 is shown for exemplary purposes as a blender scraper, it is seen that the heads 3, 4 are of circular configuration since such configuration is the most conventional form for blender bowls. In any event it will be recognized that other shapes for the heads could be used. It is intended that the heads be adapted to scrape the entire surface of the bowl upon application of a single downward thrust to the gripping sphere and handle members 7, 6 respectively. For this purpose the scraping heads are therefore designed to intimately contact and operatively engage one another so that no unscraped surface of the bowl will remain.

Operative communication of the scraping heads 3, 4 is accomplished by an adjustable connecting means. Specifically, the adjustable connection means is exemplified herein by a tongue and groove means type construction wherein the tongue is composed of the vertical wall 3c on the scraper head 3 and a similar vertical wall 4c on the scraper head 4. Note that the tongues are on opposing scraping heads so as to enhance even force distribution similarly, the groove means 3a, 3b and 4a, 4b are disposed on opposing scraping heads, that is, one on each of the heads 3, 4. The cooperating structure consists of the groove means 4a, 4b on one side of head 4 and tongue or vertical wall 4c on the other side of head 4, while the groove means 3a, 3b is on one side of head 3 with the tongue 3c on the other; all being disposed so that the engaging action occurs on both heads, it will of course be recognized that the dimensions and thickness of the cooperating elements are gauged to insure a sliding fit of the tongues into the grooves.

In order to insure effective scraping of food material from the walls of the container, it is necessary to impart to the scraping heads a pre-determined outwardly directed radial force. The present invention accomplishes this result in a most unique manner by means of the configuration of the fork-like arms 5. As best shown in FIG. 1, these arms extend in cantilever manner from the lower end of handle member 6 and assume an S like configuration that terminates at the remote ends 5a, 5b. As will be recognized, application of a downward force along the longitudinal axis of handle member 6 causes an inward flexing at the upper end of fork-like arms 5, the effect of which produces a tendency to spread the lower or remote ends 5a, 5b of said arms. Such result is effectively brought about by constructing the arms of a stiff or springy like material such as light weight metal or plastic. Such downwardly directed axial force thus causes the scraping heads 3, 4 to bear with greater pressure on the interior surfaces of the container and thus provides a more effective scraping action.

Figure 2:
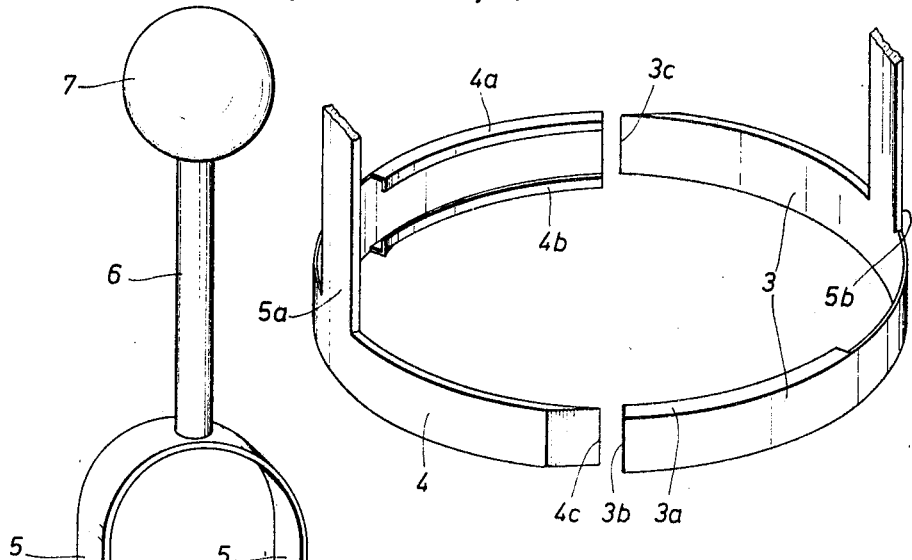
FIGURE 2 illustrates the scraper device of FIGURE 1 when the two sections which comprise the scraping heads are distended from one another.

In operation the scraper is merely inserted into a blender bowl. The blender blades may be rotating without harm or danger to the person or the blender scraper since the scraper heads 3, 4 completely surround the blades without coming in contact therewith and since no other portion of the scraper device can possibly touch the blades. A slight downward thrust is applied to handle member 6 and as the scraper heads 3, 4 travel down the bowl sides, material is effectively removed from the interior. It may be well to note that the relative tongue and groove structures of heads 3, 4, respectively, might be interchanged with respect to one another depending upon the direction of rotation of the blender blades. This is noted in order to prevent the lodging of material or foodstuffs within the groove formed by walls 4a, 4b and 4c, that is if the blades of the blender are rotating in a counter clockwise manner the structure of FIGURES 1 and 2 would be more appropriate since food material would not be as easily lodged in the scraping heads. Conversly, if the blades were rotating in a clockwise manner the device could be cleaned easier if the tongue and groove structure were in reverse position to that which is shown. Thus if it is necessary to move the scraper up or down the bowl as the blender is operating, it will be recognized that the combined spring-like action of form arms 5 and the cooperating connection means on the scraper heads provide for and insure that effective scraping will occur since the heads themselves will inherently adjust so as to conform to the surface of the container. Clearly, if the blender bowl is straight, that is, of equal cross-sectional size, the scraper device hugs the wall of the blender bowl in the same way as it would if the bowl were of tapered configuration.

It will be obvious that the principles of this invention may be effectuated in a number of different ways. For example, although a two section scraping head device is shown and same is of circular configuration, it will be readily recognized that other multi-sectioned scraping heads could be constructed and that same may be of different configuration so as to fit different types of blender bowls and other containers.

In any event it is expressly intended that the description herein is to be construed as illustrative of the concept and the protection determined and limited only by this description when taken in light of the appended claims.

Therefore, what is claimed and desired to be secured by Letters Patent is:

1. In a scraping device for effectuating removal of excess substance from a container upon insertion therein comprising:
   a handle member which is adapted to be moved along an imaginary longitudinal axis extending therethrough,
   fork-like arms affixed to an end of said handle member,
   a scraper head affixed to the end of each of said fork-like arms remote from said handle member, each of said heads being shaped to conform to a portion of the interior surface of the container, and
   means for adjustably and directly connecting each of said scraper heads to one another so that upon movement of said handle member into the container the scraper heads adustably adapt themselves to the surface configuration thereof.

2. The scraping device of claim 1 wherein each of said fork like arms includes bias means for urging the arms radially outwardly with respect to said longitudinal axis, thereby transmitting more effective scraping force to said scraping heads.

3. The scraping device of claim 2 wherein each of said scraper heads is of substantially semi-circular shape so as to conform to the interior of a round container, and said means adjustably connecting said scraper heads consists of a tongue means on one head and a groove means on the other, said tongue being adapted to slidingly engage said groove.

4. The scraping device of claim 1 wherein each of said fork like arms is arched concavely inwardly from its respective scraper head to said handle member so as to produce outward pressure of said heads upon compression on said handle member.

5. The scraping device of claim 4 wherein each of said scraper heads is of substantially semi-circular shape so as to conform to the interior of a round container, and said means adjustably connecting said scraper heads consists of a tongue means on one end and a groove means on the other, said tongue being adapted to slidingly engage said groove.

6. The scraping device of claim 1 wherein each of said fork like arms is constructed of resilient material and of such configuration as to produce radially outward movement of the heads upon compression of the handle member so that movement of said handle member downwardly causes the heads to bear on the walls of the container, while upward movement of the handle causes the heads to return to their normal position.

7. The scraping device of claim 6 wherein each of said scraper heads is of substantially semi-circular shape so as to conform to the interior of a round container, and said menas adjustably connecting said scraper heads consists of a tongue means on one head and a groove means on the other, said tongue being adapted to slidingly engage said groove.

8. The scraping device of claim 1 wherein each of said scraper heads is of substantially semi-circular shape so as to conform to the interior of a round container, and said means adjustably connecting said scraper heads consists of a tongue means on one head and a groove means on the other, said tongue being adapted to slidingly engage said groove.

References Cited

UNITED STATES PATENTS

| 415,282 | 11/1889 | Radspinner | 15—104.18 |
| 919,395 | 4/1909 | Thayer | 15—104.8 |
| 1,693,582 | 11/1928 | Kochy. | |
| 2,524,116 | 10/1950 | Rein | 15—236 |

WALTER A. SCHEEL, Primary Examiner

L. G. MACHLIN, Assistant Examiner